Figure 1:
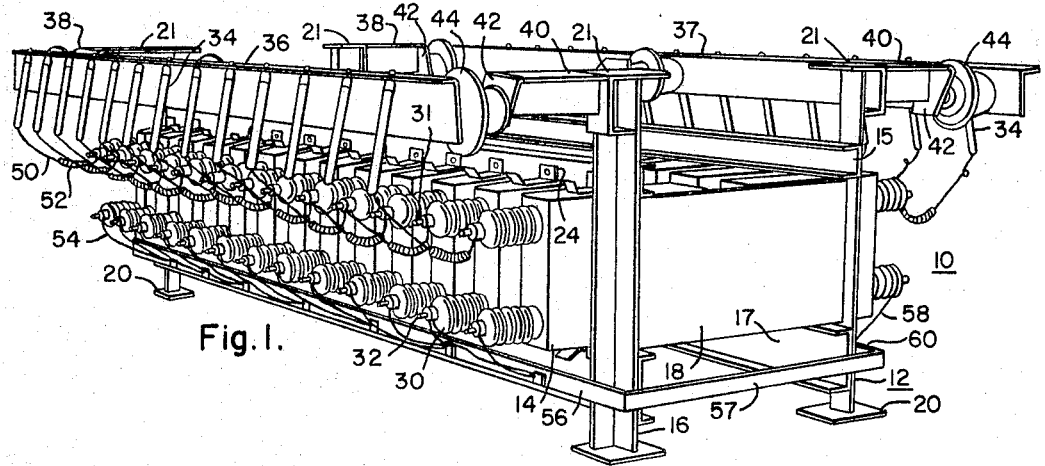

Aug. 9, 1966 W. H. CUTTINO 3,265,934
CAPACITOR STACKING UNIT
Filed Jan. 30, 1964 3 Sheets-Sheet 1

INVENTOR
William H. Cuttino
BY
ATTORNEY

United States Patent Office 3,265,934
Patented August 9, 1966

3,265,934
CAPACITOR STACKING UNIT
William H. Cuttino, Bloomington, Ind., assignor to Westinghouse Electric Corporation, Pittsburgh, Pa., a corporation of Pennsylvania
Filed Jan. 30, 1964, Ser. No. 341,364
3 Claims. (Cl. 317—99)

The present invention relates to capacitor stacking units, and more particularly to such units which are especially suitable for forming comparatively large kilovar banks at field locations.

A capacitor stacking unit is formed from a plurality of individual capacitor units which are suitably mounted and interconnected on a stacking unit frame. With standardized stacking unit sizes and arrangements, large corrective kilovar blocks can be economically provided at a given location through suitable placement and interconnection of the required number of capacitor stacking units. A foundation arrangement is normally provided for supporting the stacking units in one or more stacked vertical columns up to a given height.

The organization of a stacking unit frame and the individual capacitor units in relation to the frame are determinants of the end utility achieved for the stacking unit. It is important, for example, that the stacking unit have excellent structural strength with as few frame parts as possible. Further, it is desirable that the frame height of a unit of given kilovar rating be relatively minimized so that a relative maximum ratio of kilovars to foundation investment dollars can be provided for one or more stacks of such units. Such minimization of unit height also permits higher voltage service to be obtained from a stack of given height.

With these and other ends as goals, the present invention provides a capacitor stacking unit comprising a box-like frame and a plurality of capacitors edge mounted therein in horizontally spaced rows. The more extensive side edges of the capacitors thus extend in the horizontal direction and a lower frame height is achieved. Since all of the capacitor mounting brackets in each capacitor row are disposed in a common vertical plane, vertically spaced primary frame members can provide total capacitor support and in turn be rigidized relative to each other so as to strengthen the entire frame. Further, the respective sets of terminals of the capacitors in the two row face horizontally outward through opposed frame sides for attachment to fuses suspended from frame supported bus means which are well isolated electrically.

It is, therefore, an object of the invention to provide a novel capacitor stacking unit which is characterized with improved structural strength.

Another object of the invention is to provide a novel capacitor stacking unit which is comparatively low in height so as to provide for installation economy and further so as to provide for higher voltage service from a stack of such units of given total height.

A further object of the invention is to provide a novel capacitor stacking unit in which the line connecting bus bar means are well isolated.

An additional object of the invention is to provide a novel capacitor stacking unit in which the individual capacitor fuses are readily observable and accessible.

It is another object of the invention to provide a novel capacitor stacking unit in which efficient capacitor cooling and efficient rainwashing of the capacitor bushings are achieved.

Figure 2:
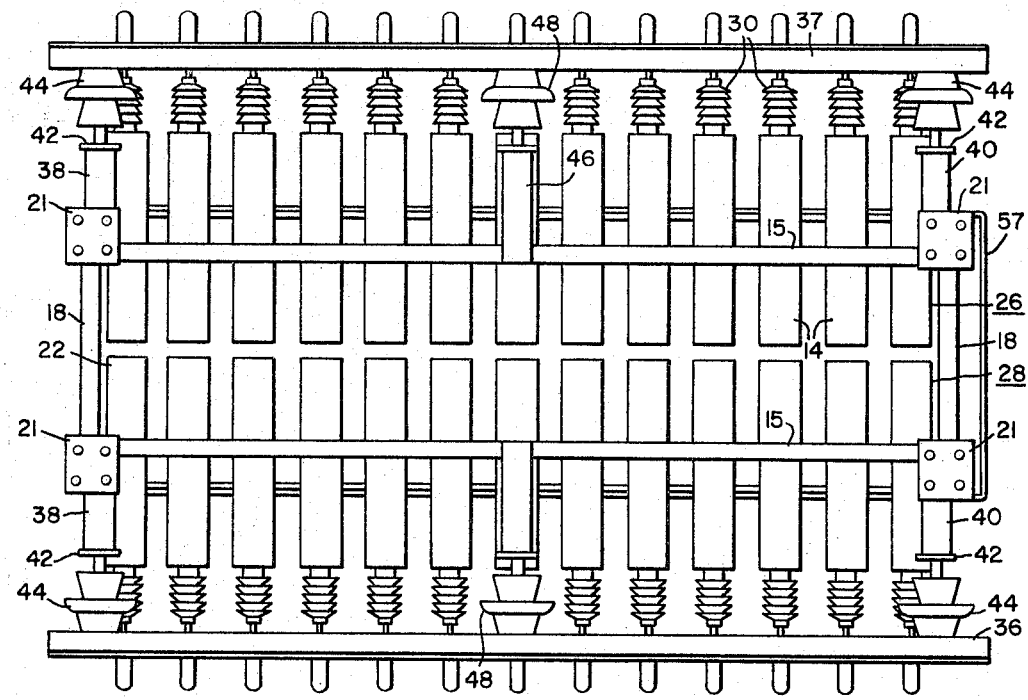
Figure 3:
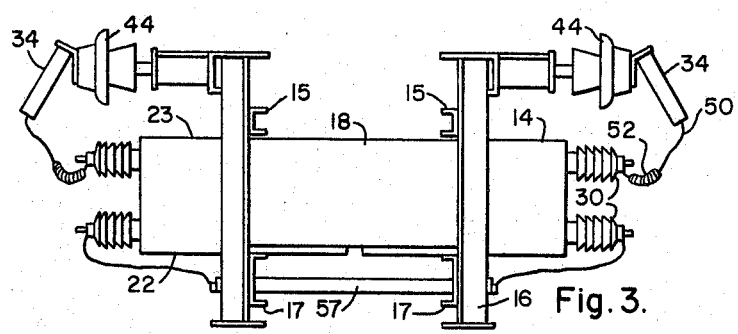
Figure 4:
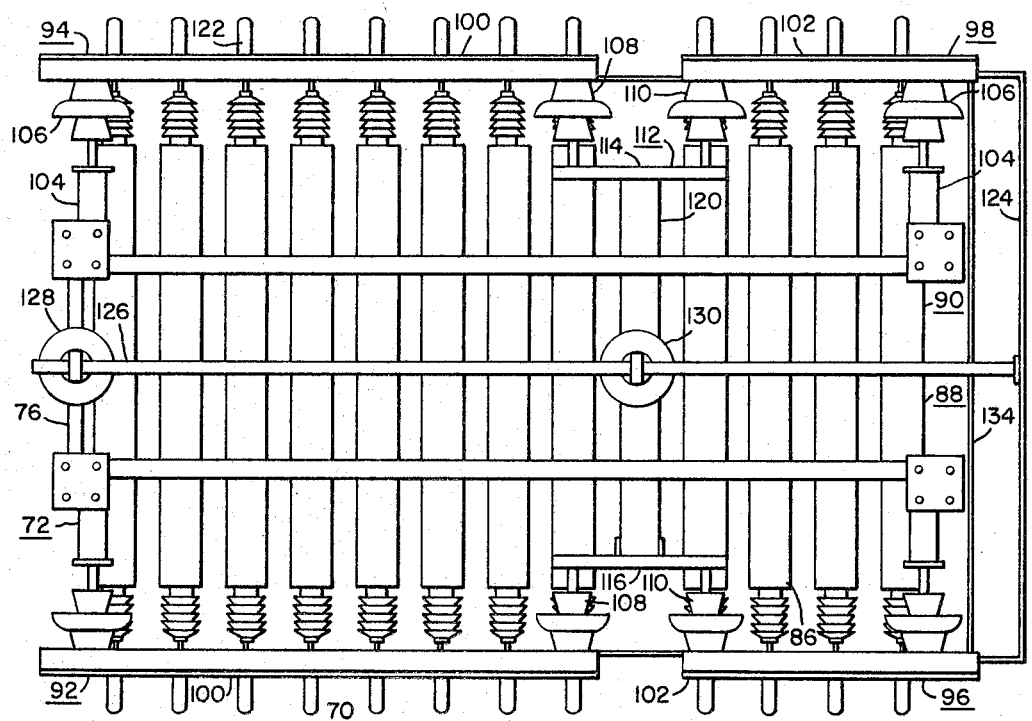
Figure 5:
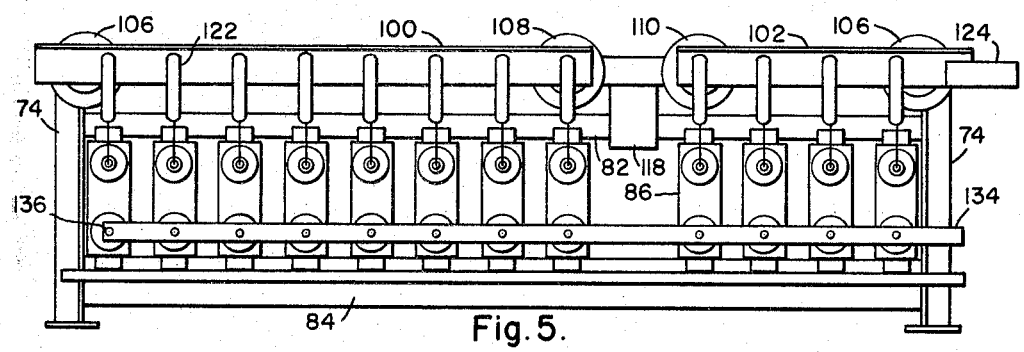
Figure 6:
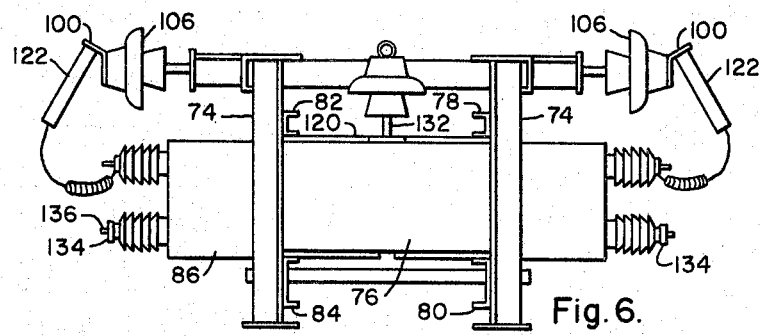
Figure 7:
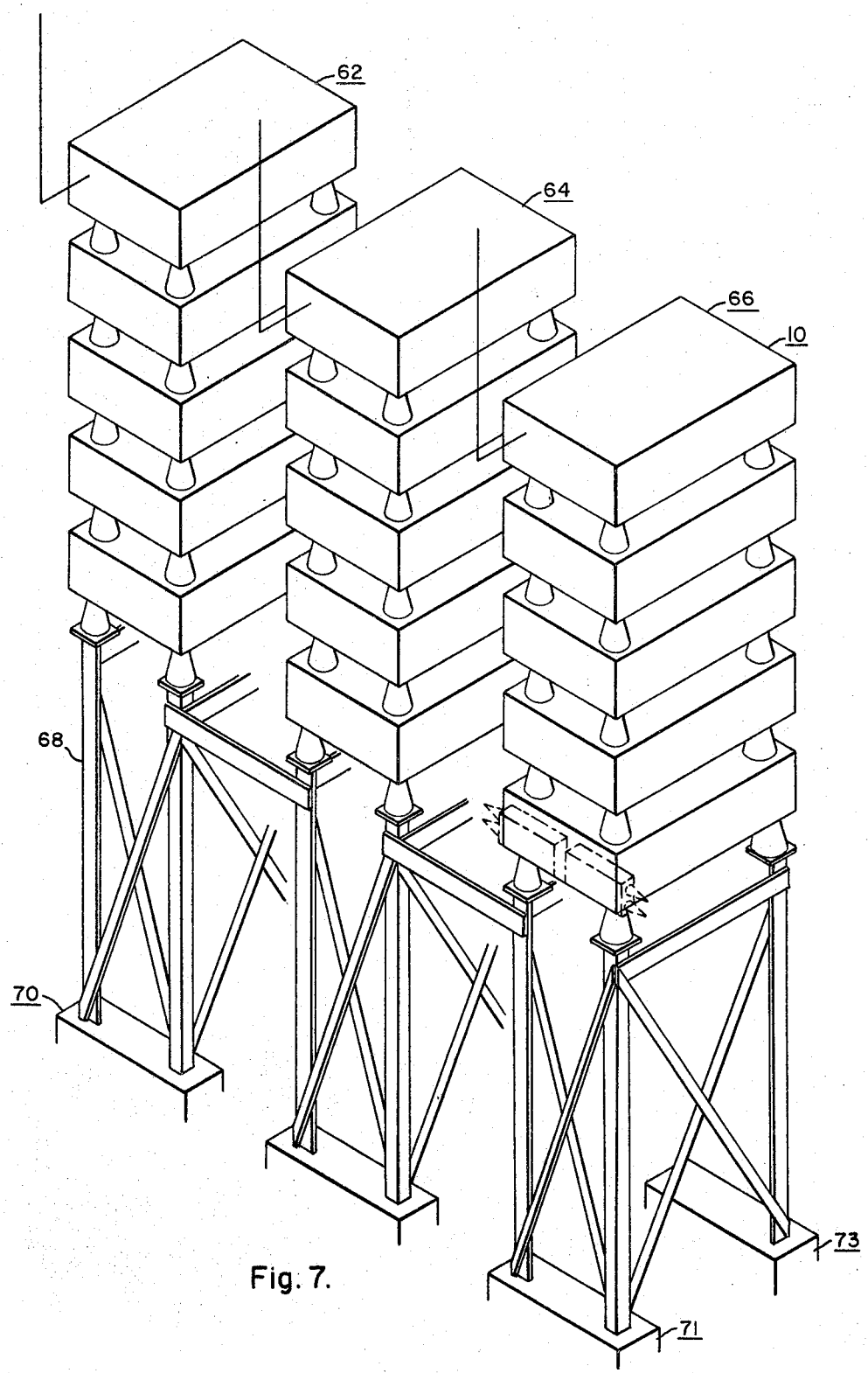

These and other objects of the invention will become more apparent upon consideration of the following detailed description along with the attached drawings, in which:

FIGURE 1 is a perspective view of a capacitor stacking unit constructed in accordance with the principles of the invention;
FIG. 2 is a top plan view of the unit shown in FIG. 1;
FIG. 3 is an end view of the unit shown in FIG. 1;
FIG. 4 is a top plan view of a three phase capacitor stacking unit constructed in accordance with the principles of the invention;
FIG. 5 is a side elevational view of the three phase unit shown in FIG. 4;
FIG. 6 is an end view of the three phase unit shown in FIG. 4; and
FIG. 7 is a perspective view of schematically illustrated capacitor stacking units arranged in a plurality of stacks on an elevating substructure.

More specifically, there is shown in FIGS. 1–3 a capacitor stacking unit 10 comprising a box-like structural frame 12 and a plurality of capacitors 14 supported by the frame 12. Preferably, the frame 12 is formed from a structural material such as galvanized steel suitable for outdoor use and the size of the frame 12 is determined by the number and size of individual capacitors 14 to be provided in the finished unit for a given kilovar application.

In greater detail, the frame 12 is formed from a plurality (four in this case) of upright posts 16 (in this instance "angle" structural members) which are rigidly interconnected by respective pairs of upper and lower elongated capacitor supporting frame members (in this instance channel structural members) and by respective cross plates or members 18 adjacent the respective ends of the frame 12. The capacitor supporting frame members 15 and 17 are referenced as being elongated since the number of capacitors 14 to be supported in the frame 12 in this case require an elongated dimension for the frame 12. In other applications, the extending dimension of the capacitor supporting frame members 15 and 17 can be conceivably be shorter than the extending direction of the cross plates 18 and therefore in such case would not properly be characterized as being elongated in relation to the cross plates 18. However, in the interest of descriptive clarity, the capacitor supporting frame members 15 and 17 will be referenced herein as being elongated irrespective to whether this is relatively true.

To provide a securance of the elongated frame members 15 and 17 and the cross plates 18 to the frame posts 16, any suitable means such as bolts (not shown) can be employed. Further, the posts 16, which are disposed at the corners of the box frame 12, have respective mounting pads 20 and 21 secured thereto as by welding respectively on the bottom and top thereof. The pads 20 thus adapt the unit 10 for disposition on top of other similar units in stacked relation or on top of an elevating substructure when the unit 10 is installed for use.

Normally, the bushings and terminals of a power capacitor are disposed on a side of the capacitor unit designated as the top. Further, in the usual case, the upstanding dimension of the capacitor unit is somewhat greater than both its length and its width or thickness in the horizontal direction. Consequently, in the interest of minimizing stacking frame height, it is advantageous to dispose the capacitors 14 within the frame 12 such that the greatest or the normally upstanding capacitor dimension is extended to the stacking unit horizontal direction. In the present case, the capacitors 14 are edge mounted to achieve this result. By "edge mounted" it is meant that each capacitor 14 is disposed such that side edges 22 and 23, which contain the thickness dimension, are disposed in spaced horizontal planes. Mounting brackets 24, which are respectively rigidly secured in corresponding positions on the side edges 22 and 23 of each capacitor unit 14, are then disposed in a common vertical plane for attachment to the frame 12.

The individual capacitors 14 are thus arranged in spaced parallel rows 26 and 28 extending in the horizontal longitudinal dimension of the frame 12. Further, the capacitors 14 are disposed in the individual rows 26 and 28 such that bushings 30 and terminals 31 and 32 extend horizontally outwardly through the associated longitudinal frame side for electrical interconnection with the power lines (not shown) for which kilovar service is desired. Depending on the application, each of the terminals 32 can have a bushing 30 insulating it from the metallic housing of the associated capacitor 14 or it can be electrically common to the housing of the associated capacitor 14 in which case a bushing 30 is unnecessary.

The mounting brackets 24 are secured by suitable means, such as bolts, to the vertically spaced and horizontally extending longitudinal frame members 15 and 17. These frame members are "primary" in the sense that they are essential to the formation of the structure of the frame 12, and it is thus noted that the capacitors 14 are mounted relative to the frame 12 without the added requirements of special frame members to which the capacitor mounting brackets 24 can be secured.

As a consequence of the structural organization of the capacitor stacking unit 10 so far described, there is achieved comparatively lower frame height for a unit of given kilovar rating. Further, the capacitor units 14 directly rigidize the frame 12 because of their inter-connection between the primary frame members 15 and 17. Since the bushings 30 extend outwardly in the horizontal direction, they are disposed for receiving good washing action by means of rain. Further, terminals 31 are disposed in a location where respective fuses 34, which are connected thereto for overcurrent protection, are readily observable for blowout detection and in addition are situated for quick replacement.

In connection with the fuses 34, it is noted that a set of these items is associated with each capacitor row 26 or 28, and the fuses 34 in each set are suitably secured to and suspended from a longitudinally extending bus bar or fuse rail 36 or 37 which is disposed horizontally outwardly of and vertically above the associated capacitor row 26 or 28. The bus bar 36 or 37 is supported in place by means of respective horizontal frame extensions 38 and 40 which are respectively attached by suitable means such as bolts to the associated longitudinally spaced pair of top pads 21. An end plate 42 is formed on each frame extension 38 or 40 and an insulator support 44 formed from porcelain or the like is secured thereon. The bus bars 36 and 37 in turn are supported on the associated pairs of insulator supports 44.

If desired, and as preferred in the present case, an additional frame extension 46 and an associated pair of insulator supports 48 can be disposed midway between the frame extensions 40 and attached to each primary frame member 15 so as to provide centrally disposed support for the bus bars 36 and 37. Respective power lines can be suitably connected to the bus bars 36 and 37 so as to interconnect the capacitors 14 with such lines, as generally mentioned previously. Since the bus bars 36 and 37 are comparatively widely separated in a horizontal plane good electrical isolation is maintained therebetween.

Each fuse 34 is connected through a fuse link 50 and a suitable indicator assembly 52 to the terminal 31 of the associated capacitor 14. Since a capacitor 14 is disconnected from the line circuit whenever its fuse 34 is blown, it is important that a blown fuse be detected as soon as possible. This minimizes the time over which the remaining in-circuit capacitors 14 carry an increased reactive current load. Such maintenance is greatly facilitated by the present structural organization as already indicated because of the exterior (relative to the frame) and readily observable location of the fuses 34 and the fuse indicator assemblies 52.

When the capacitors 14 are line connected as previously described, the capacitors 14 in row 28 are then connected in parallel between an incoming line and, through respective leads 54 and frame or ground bus 56, the frame 12. Similarly, the capacitors 14 in the capacitor row 26 are connected in parallel between the associated incoming power line and the frame 12 through respective leads 58 and frame or ground bus 60 (which can be tied to bus 56 through end bus 57, if desired). If desired, however, line bus bars 36 and 37 can respectively be suitably divided into insulatively spaced but mechanically intersupported segments (not shown) to provide sub-groups of capacitors 14 with the respective sub-groups of each row 26 or 28 interconnected in series for higher voltage service.

As shown in FIG. 7, a plurality of stacking units 10 can be stacked in one or more stacks 62 or 64 or 66 and suitably interconnected (as by aluminum bus bars) or insulated (as by heavy duty porcelain insulators) to provide the total kilovar service required at a given installation. If desired for safety, and elevating substructure 68 can be provided for supporting the stacks 62 or 64 or 66 on a foundation arrangement 70. Since the capacitor stacking units 10 are provided with a comparatively minimized height, a given amount of kilovar service can be provided with either lower or fewer or both lower and fewer capacitor unit stacks. As a consequence of this fact, fewer investment dollars are required in the foundation arrangement 70, particularly if the foundation arrangement 70, as is usually the case, comprises a pair of spaced footer-type foundation blocks 71, 73 for each capacitor unit stack.

In FIG. 4, there is shown another embodiment of the invention which in essentials is similar to the embodiment shown in FIG. 1, but differs therefrom through its adaptation for three-phase service. Thus, a three-phase capacitor stacking unit 70 is provided with a structural frame 72 which is formed from corner posts 74 rigidly interconnected at one end thereof by means of a cross plate 76 and in the frame longitudinal dimension by means of vertically spaced capacitor supporting frame members 78 and 80 on one longitudinal side thereof and members 82 and 84 on the opposite longitudinal side thereof. Capacitors 86 are supported in respective longitudinal horizontally extending parallel rows 88 and 90. The capacitors 86 are again edge mounted so that they are oriented and disposed in relation to the primary frame members 78, 80, 82 and 84 in a manner similar to that described for the embodiment of FIG. 1.

Generally, the capacitors 86 are interconnected for three-phase operation as follows: Assume that there are $x$ capacitors 86 in each row 88 or 90, and the first $y$ capacitors 86 are parallel connected in a group 92 or group 94 in the capacitor rows 88 and 90. The remaining or $(x-y)$ capacitors in each row 88 or 90 are then parallel connected in a group 96 or 98 and the groups 96 and 98 are parallel connected. For phase balance, $y$ is made equal to $\frac{1}{2}x$.

Structurally, these connections are achieved by respective bus bars or fuse rails 100 and 102 disposed for connection to each capacitor row 88 or 90. The respective pairs of bus bars 100 and 102 are generally aligned in the longitudinal direction on the respective longitudinal sides of the frame 72, but are electrically isolated as a primary difference from the single continuous bus bar 36 or 37 of FIG. 1. The bus bars 100 and 102 are otherwise supported and disposed in a manner similar to that described in connection with the bus bar of FIG. 1 so as to provide for convenient fuse observation and maintenance.

Thus, a frame extension 104 and an insulator support 106 are supported on each frame post 75 so as to extend horizontally outward and in turn support the longitudinally outmost end of the associated bus bar 100 or 102. The longitudinally inmost end of each bus bar 100 or 102 is also supported by means of an insulator support 108 or 110 which in turn are jointly supported in paired spaced relation on an intermediate cross support member 112.

For this purpose, the support member 112 is provided with respective end plates 114 and 116 on which the respective pairs of insulator supports 108 and 110 are rigidly secured. The end plates 114 and 116 are joined together through a generally U-shaped member 118 which is provided with a bight portion cross beam 120 to provide cross frame support in addition to that provided by the end plate 76 since it is rigidly secured to the longitudinally extending primary frame members 78 and 82. With the bus bars 100 and 102 supported as described, capacitor group connections are then made through fuses 122 respectively connected to the upper terminal of each capacitor 86 so that the capacitors 86 in group 94 are commonly connected to the associated bus bar 100, the capacitors 86 in group 98 are commonly connected with the associated bus bar 102, etc.

The two bus bars 102 are connected in common by means of a cross connector 124 which is suitably attached thereto so that the capacitors 86 of the two groups 96 and 98 are then connected in parallel to form one of the three electrical phase circuits. A bus rail 126 is in turn connected to the cross connector 124 by suitable means (as by welding) and extended longitudinally of the frame 72. Mechanical support for the rail 126 is provided through insulator supports 128 and 130 respectively disposed on base members 132 which in turn are respectively affixed to the cross plate 76 and the cross beam 120. When a power line is connected to the bus rail 126, it is thus electrically connected to the two bus bars 102.

If it is desired that the phase circuits provided by the capacitors 86 in the frame 72 be connected in a Y relationship, a bus bar arrangement 134 can be employed to connect lower terminal 136 of all the capacitors 86 in common with each other. If it is desired to form a delta connection of the capacitors 86, the bus arrangement 134 is omitted and suitable conductor or bus means (not shown) can be used to connect terminals 134 of capacitor groups 96 and 98 in common and terminals 134 of capacitor groups 92 and 94 in common. Additional suitable bus means (not shown) can be used to form a series connection between the bus rail 100 associated with capacitor group 92 and the common terminals 134 of capacitor groups 96 and 98 as well as another separate series connection between the other bus rail 100 and the bus rail 102 associated with the capacitor group 98. The delta connection is then complete.

Similar to the results discussed in connection with the previous embodiment of FIG. 1, good electrical isolation is achieved among the two bus bars 100 and the bus rail 126. Further, among others, the advantages of frame strengthening and minimum stack unit height are achieved as a result of the capacitor disposition and edge mounting arrangement.

The foregoing description has been presented only to illustrate the principles of the invention. Accordingly, it is desired that the invention be not limited by the embodiments described, but, rather, that it be accorded an interpretation consistent with the scope and spirit of its broad principles.

What is claimed is:
1. A compact, rigid, high voltage capacitor stacking unit comprising a box-like frame structure having a plurality of relatively short posts physically supported in an upright manner by interconnecting elongated members vertically spaced apart in substantially horizontal and parallel planes, a plurality of generally rectangularly shaped capacitors mounted between and secured to at least two of the vertically spaced apart members so that all capacitor insulating bushings and terminals face in an exposed and outward direction from the side of the box-like frame, each of said capacitors further being mounted on a side thereof having a narrow dimension in physical contact with the vertically spaced apart members to form a horizontal and parallel array of capacitors, bus means for interconnecting the capacitors in a given circuit pattern, said bus means including a continuous conductive bus bar extending along at least two opposite sides of the frame structure, and horizontal frame extension means insulatingly supporting said bus bars remotely and horizontally outwardly of said frame sides adjacent the capacitor bushings and terminals, said bus bars supporting a plurality of fuses connected between the bus bars and capacitors outwardly of the sides of the frame structure.

2. The stacking unit of claim 1, in which the bus means further includes a bus rail supported by the frame structure and extending therealong between the frame sides supporting the bus bars, a second bus bar generally aligned with the first mentioned bars and extending along another portion of each of said opposite frame sides, a connecting means for interconnecting said capacitors and said bus means in a three phase pattern, said connecting means including a cross member electrically tying the bus rail and the second bus bars together.

3. A compact, rigid, high voltage capacitor stacking unit comprising a box-like frame structure having a plurality of relatively short posts physically supported in an upright manner by interconnecting elongated members vertically spaced apart in substantially horizontal and parallel planes, two rows of generally rectangularly shaped capacitors mounted between and secured to at least four of the vertically spaced elongated members in a back-to-back relationship so that all capacitor bushings and terminals face in an exposed and outward direction from at least two sides of the box-like frame, each of said capacitors further being mounted on a side thereof having a narrow dimension in physical contact with the vertically spaced apart members to form a horizontal and parallel array of capacitors, bus means including a continuous conductive bus bar extending along at least two opposite sides of the frame structure, and horizontal frame extension means insulatingly supporting said bus bars remotely and horizontally outwardly of said frame sides adjacent the capacitor bushings and terminals, said bus bars supporting a plurality of fuses connected between the bus bars and capacitors outwardly of the sides of the frame structure.

References Cited by the Examiner
UNITED STATES PATENTS

| | | | |
|---|---|---|---|
| 1,821,803 | 9/1931 | Haefely | 317—260 |
| 2,158,868 | 5/1936 | Stacy | 317—242 |
| 2,722,634 | 1/1955 | Marbury | 317—99 |

ROBERT K. SCHAEFER, *Primary Examiner.*

KATHLEEN H. CLAFFY, *Examiner.*

H. RICHMAN, *Assistant Examiner.*